(12) United States Patent  
House

(10) Patent No.: US 7,115,057 B2
(45) Date of Patent: Oct. 3, 2006

(54) DRIVE AXLE ASSEMBLY FOR HYBRID ELECTRIC VEHICLE

(75) Inventor: Dean M. House, Pataskala, OH (US)

(73) Assignee: ArvinMeritor Technology LLC, Troy, MI (US)

( * ) Notice: Subject to any disclaimer, the term of this patent is extended or adjusted under 35 U.S.C. 154(b) by 201 days.

(21) Appl. No.: 10/860,505

(22) Filed: Jun. 3, 2004

(65) Prior Publication Data

US 2005/0272547 A1 Dec. 8, 2005

(51) Int. Cl.
F16H 3/72 (2006.01)
F16H 37/08 (2006.01)
F16H 48/06 (2006.01)
B60K 1/00 (2006.01)

(52) U.S. Cl. ............. 475/5; 475/221; 475/204; 180/65.2

(58) Field of Classification Search .......... 475/5, 475/221, 317, 202, 204, 265; 180/65.1, 65.2, 180/65.4, 65.6, 291, 292
See application file for complete search history.

(56) References Cited

U.S. PATENT DOCUMENTS

| | | | | |
|---|---|---|---|---|
| 3,315,544 A | * | 4/1967 | Wickman et al. ........... 475/136 |
| 4,050,328 A | * | 9/1977 | Romick ....................... 475/221 |
| 5,168,946 A | * | 12/1992 | Dorgan ......................... 475/5 |
| 5,713,425 A | * | 2/1998 | Buschhaus et al. ........ 180/65.2 |
| 5,878,830 A | * | 3/1999 | Ruppert et al. ........... 180/65.5 |
| 5,924,504 A | | 7/1999 | Ruppert, Jr. et al. |
| 6,024,182 A | * | 2/2000 | Hamada et al. ............ 180/65.2 |
| 6,276,474 B1 | | 8/2001 | Ruppert et al. |
| 6,431,298 B1 | | 8/2002 | Ruppert, Jr. et al. |
| 6,540,035 B1 | * | 4/2003 | Nagano et al. ............ 180/65.2 |
| 6,661,109 B1 | * | 12/2003 | Fukasaku et al. ......... 180/65.1 |
| 6,935,451 B1 | * | 8/2005 | Bell et al. .................. 180/65.5 |
| 6,991,571 B1 | * | 1/2006 | Gady et al. ..................... 475/5 |
| 2003/0054910 A1 | * | 3/2003 | Nett ............................... 475/5 |
| 2004/0192487 A1 | * | 9/2004 | Teraoka ....................... 475/198 |
| 2004/0220011 A1 | * | 11/2004 | Gumpoltsberger et al. . 475/205 |

FOREIGN PATENT DOCUMENTS

DE 20010563 U1 * 10/2000

* cited by examiner

Primary Examiner—Roger Pang
(74) Attorney, Agent, or Firm—Carlson, Gaskey & Olds

(57) ABSTRACT

An axle assembly mounts an electric motor to a central housing opposite an input yoke that is driven by an engine. The input yoke is mounted along an axis parallel to the electric motor to alternatively or additionally permit the engine to drive a gear reduction within the axle housing through a planetary gear assembly. Another axle assembly is powered by just an electric motor to provide a relatively lighter duty axle assembly for yet another vehicle configuration.

24 Claims, 4 Drawing Sheets

DRIVE AXLE ASSEMBLY FOR HYBRID ELECTRIC VEHICLE

BACKGROUND OF THE INVENTION

The present invention relates to a drive axle assembly including an electric motor, and more particularly to an axle configuration that locates the electric motor in an axle housing opposite from an engine input.

There is an increasing demand for hybrid electric driven and hybrid electric assisted vehicles. Electric motors for such applications are typically sized to meet both torque and speed requirements, which may not be the most effective for the operational requirements of such vehicles. Relatively large electric motors are often utilized to meet the torque requirements. This may result in an oversized motor for most operational conditions. Moreover, the relatively large electric motors may be difficult to package in certain vehicle configurations. Conversely, utilizing a multiple of relatively smaller electric motors may increase complexity.

Electric hybrid power trains offer advantages for both torque and speed requirements. However, vehicle manufacturers may be reluctant to adapt electric hybrid power trains to existing vehicles due to the expense associated with redesign. Such redesign often requires relatively expensive and complicated chassis modifications to mount the additional electric components such as motors and gearboxes.

Accordingly, it is desirable to provide a lightweight and compact electric motor driven axle configuration, which provides an electric hybrid power train that utilizes relatively conventional axle and suspension components to minimize redesign of existing vehicle structure.

SUMMARY OF THE INVENTION

The axle assembly according to the present invention mounts an electric motor directly to a drive axle assembly. The electric motor is mounted to an axle housing opposite an input yoke, which is driven by an engine. The input yoke is mounted along an axis parallel to the electric motor to alternatively (or additionally) permit the engine to drive a gear reduction and differential gear box located within the axle housing.

The electric motor and the engine drive the gear reduction through a planetary gear assembly. The planetary gear assembly reduces the speed from an electric motor shaft to a pinion gear within the gear reduction. The input yoke drives an input shaft which is directly engaged with a planet carrier of the planetary gear assembly such that the input shaft directly drives the pinion gear without speed reduction. That is, in a disclosed embodiment there is no reduction between the input yoke and pinion gear.

In another embodiment, an axle assembly is powered only by the electric motor to provide a relatively lighter duty axle assembly for a vehicle configuration that does not require significant modification to the axle assembly.

The present invention therefore provides a lightweight and compact electric motor driven axle configuration, which permits electric hybrid power train configurations that utilize relatively conventional axle and suspension components to minimize redesign of the vehicle structure.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 5 is a sectional side view of another axle assembly.

DETAILED DESCRIPTION OF THE PREFERRED EMBODIMENT

Figure 1:
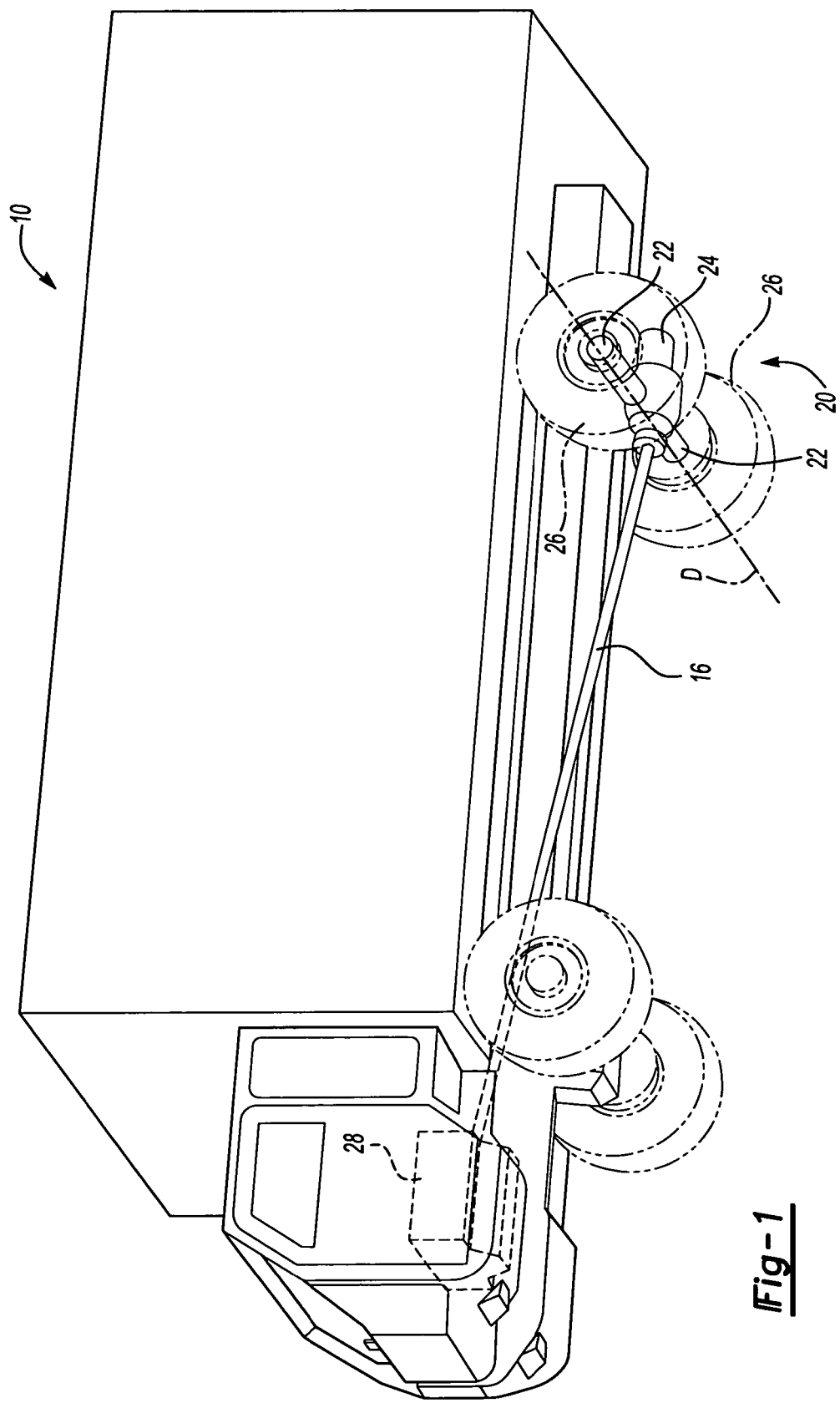
FIG. 1 is a general perspective view of an exemplary vehicle embodiment for use with the present invention.

FIG. 1 illustrates a schematic, partial phantom view of a vehicle 10. It should be understood that although a particular vehicle arrangement is disclosed in the illustrated embodiment, other vehicles will benefit from the present invention.

An axle assembly 20 is driven by an electric motor 24. An engine 28, such as an internal combustion engine, diesel engine, gas turbine or the like, may additionally be utilized to drive axle assembly 20 as a complement to the electric motor 24. Shaft 16 transmits drive from engine 28 to drive axle assembly 20. Either or both the electric motor 24 and engine 28 are utilized in selective combination in response to particular drive situations. The axle assembly 20 defines an axis of rotation D substantially transverse to shaft 16. The wheel hubs 22 each support one or more wheels 26, which are driven about the axis of rotation D.

Figure 2:
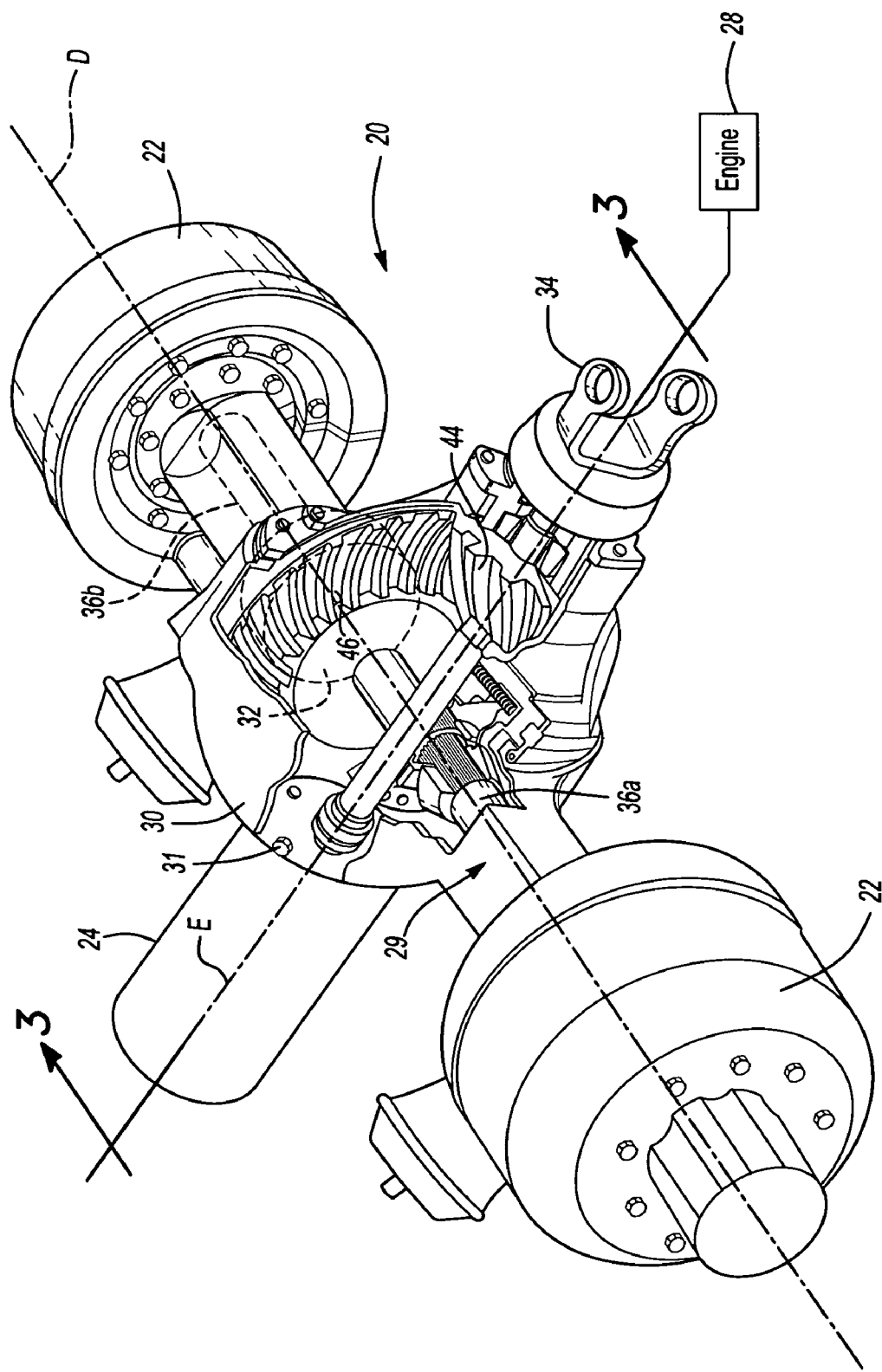
FIG. 2 is a perspective partial sectional view of an axle assembly of the present invention.

Referring to FIG. 2, the axle assembly 20 includes an axle housing 29, which supports the wheel hubs 22. The axle housing 29 includes an electric motor housing portion 30, which contains a gearbox 32 such as a gear reduction and a differential. The electric motor housing portion 30 is preferably an enlarged semi-spherical portion centrally located in the axle housing 29 between the wheel hubs 22.

Preferably, the electric motor 24 is mounted to the electric motor housing portion 30 along an axis E, which is generally perpendicular to axis D. The electric motor 24 is mounted directly to the electric motor housing portion 30 through fasteners 31 or the like. Most preferably, the electric motor housing portion 30 is formed to specifically receive the electric motor 24.

The electric motor 24 is mounted to the electric motor housing portion 30 opposite an input yoke 34 that is driven by the engine 28 through shaft 16. The input yoke 34 is preferably mounted along axis E to permit the engine 28 to alternatively or additionally drive the gearbox 32 in selective combination with the electric motor 24. The gearbox 32 drives the wheel hubs 22 through a first axle shaft 36a and a second axle shaft 36b, which rotates about axis D. The first axle shaft 36a and second axle shaft 36b are substantially enclosed within the axle housing 29.

Figure 3:
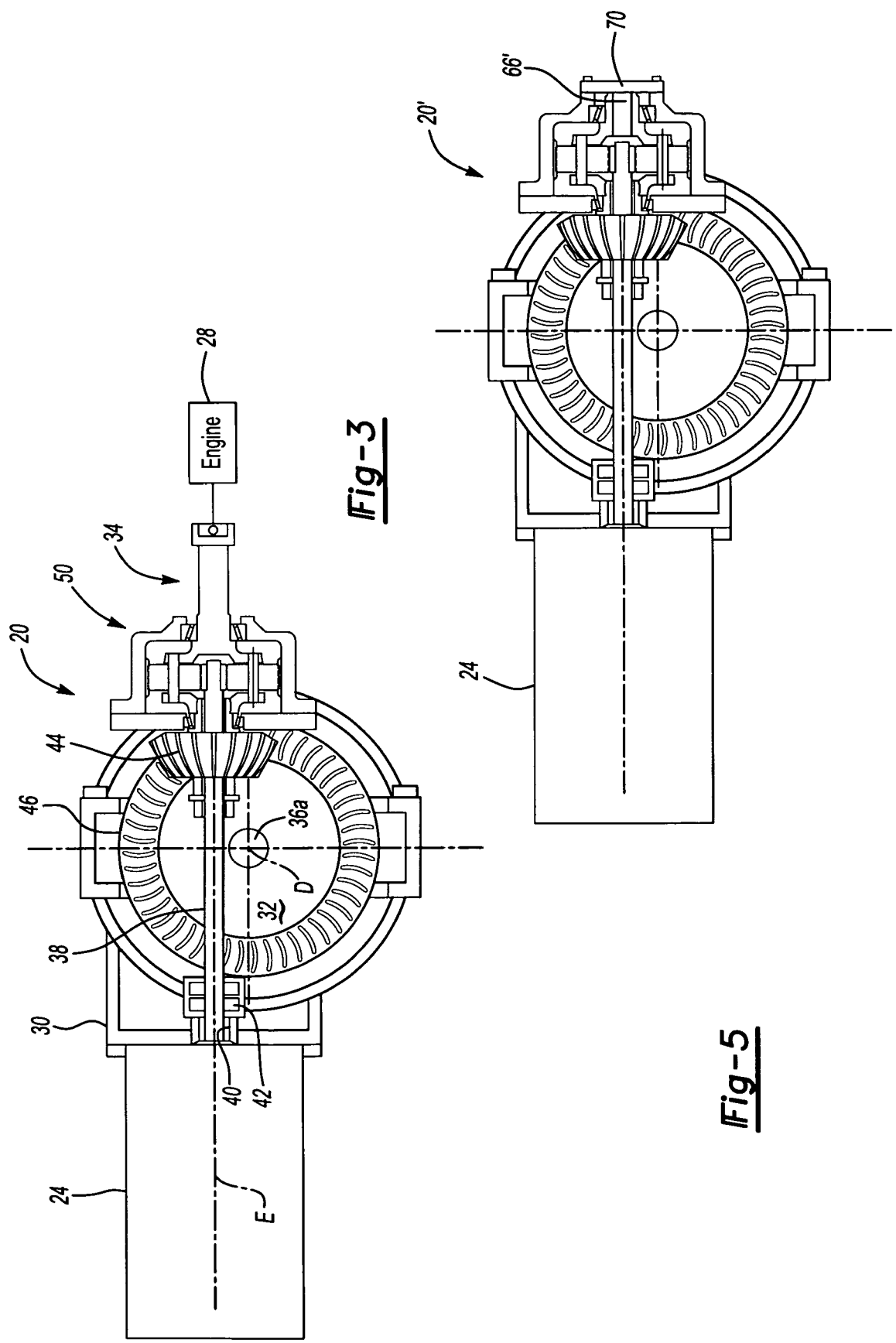
FIG. 3 is a sectional side view of an axle assembly of the present invention taken along line 3—3 in FIG. 2.

Referring to FIG. 3, the electric motor 24 drives a motor shaft 38 through a coupling 40. The coupling 40 permits the electric motor 24 to be selectively attached to the motor shaft 38 to permit the electric motor 24 to be selectively engaged or disengaged therewith in response to a controller or the like. That is, the coupling 40 may be an active coupling such as a clutch or similar mechanism which responds to a controller. A worker in this art would recognize when to connect or disconnect coupling 40 to allow electric motor 24 to drive motor shaft 38. Also, designing an appropriate control is within the level of skill in this art. The motor shaft 38 is supported for rotation along axis E by a bearing 42. It should be understood that various bearing and seal locations are included within the gearbox. One of ordinary skill in the art, with the benefit of this disclosure, would know various ways to mount motor shaft 38.

Figure 4:
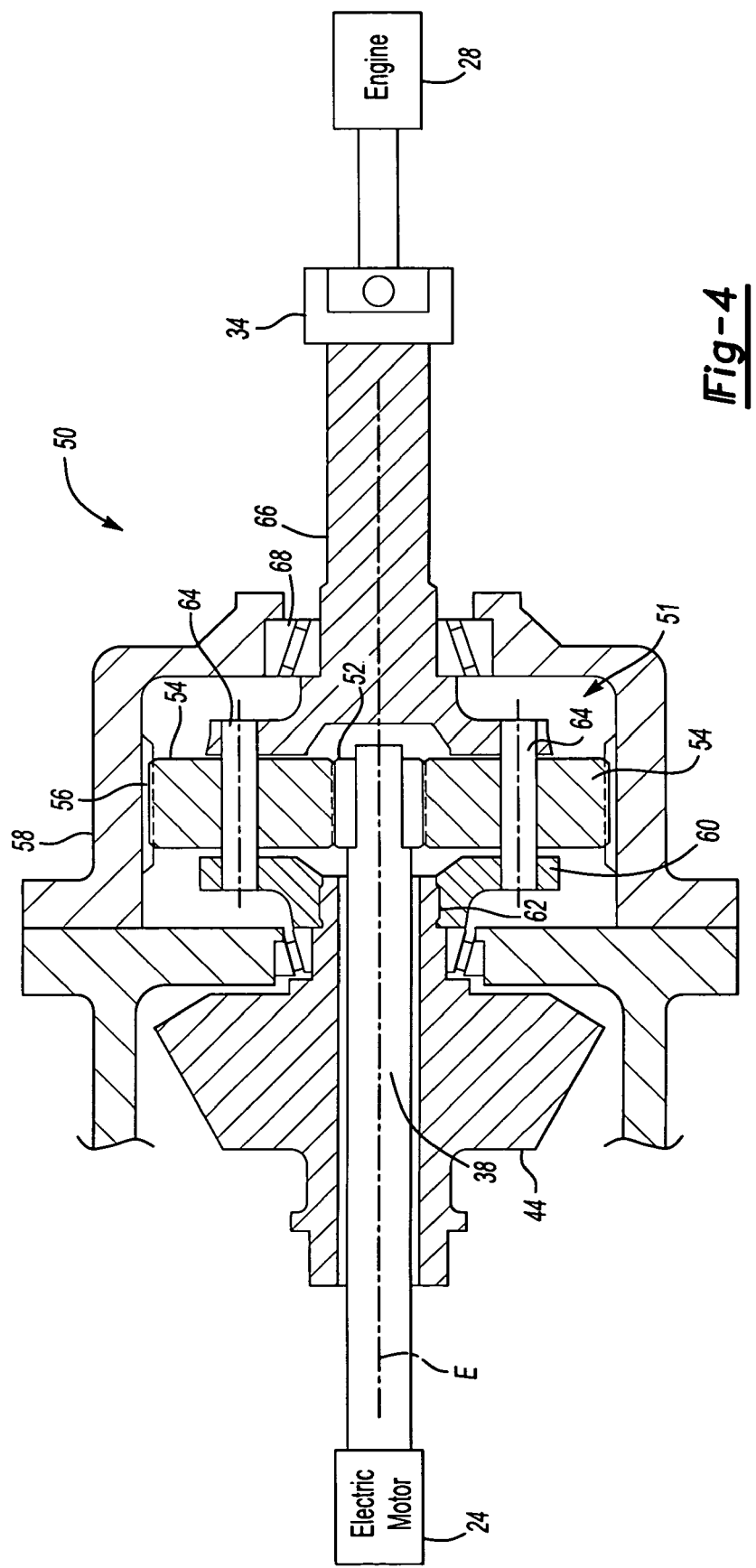
FIG. 4 is an expanded sectional view of a planetary gear assembly which receives input from both an electric motor and an engine.

The motor shaft 38 drives a pinion gear 44 that drives a ring gear 46 through an input gearbox 50 (also illustrated in FIG. 4). The input gearbox 50 also receives power from the engine 28 through the input yoke 34. That is, the input gearbox 50 operates as a transmission to receive drive input from both the engine 28 and the electric motor 24.

The motor shaft 38 is preferably vertically offset from axis D (see FIG. 3). The ring gear 46 drives the first axle shaft 36*a* and the second axle shaft 36*b* through the gearbox 32 such as a differential or the like (also illustrated in FIG. 2). The gearbox 32 may additionally include a speed reduction gearbox to provide a relatively lightweight and compact axle assembly. It should be understood that one of ordinary skill, with the benefit of this disclosure, will understand the design of various gear trains which could be utilized to transfer power from the ring gear 46 to the axle shafts 36*a*, 36*b*.

Referring to FIG. 4, the input gearbox 50 preferably includes a planetary gear assembly 51. The electric motor shaft 38 drives a sun gear 52 that drives a multiple of planet gears 54 that revolve within an outer gear 56 preferably formed within an input gearbox housing 58. The planet gears 54 drive a planet carrier 60, which is mounted to the pinion gear 44 through splines 62 or the like. The planet carrier 60 supports the planet gears 54 on pins 64 which define an axis of rotation for each of the planet gears 54 that is parallel to and displaced from axis E. The planetary gear assembly 51 reduces the speed from the motor shaft 38 to the pinion gear 44.

The input yoke 34 drives an input shaft 66 that is directly engaged with the planet carrier 60 through the pins 64. That is, as the planet carrier 60 is mounted to the pinion gear 44 through the pins 64, the input shaft 66 directly drives the pinion gear 44 without speed reduction. Preferably, the input shaft 66 is supported by a bearing 68 between the input shaft 66 and the input gearbox housing 58.

Referring to FIG. 5, another axle assembly 20' may alternatively be powered by just the single electric motor 24 to provide a relatively lighter duty axle assembly 20' for yet another vehicle configuration without major modification to the axle assembly 20'. The axle assembly 20' is driven by the electric motor 24 such that the input shaft 66' does not require an input yoke. A cover 70 protects an end of shaft 66'. It should be understood that various combinations of the axle assemblies described herein may be provided to particularly tailor an axle assembly to a particular vehicle in a modular manner.

The inclusion of an electric motor 24 directly to the axle assembly 20 utilizes relatively conventional axle, driveline, and suspension components to minimize redesign of the vehicle structure to provide a more efficient intercity transport and the like with hybrid power. That is, the electric motor 24 is mounted to the electric motor housing portion 30 to provide the advantages of utilizing an electric power system without significantly effecting how the axle assembly 20 is alternatively or additionally driven by conventional motive forces such as an internal combustion engine.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An axle assembly comprising:
a first hub assembly and a second hub assembly mounted to an axle housing for rotation about a first axis through a reduction gearbox within said axle housing, said axle housing having an electric motor axle housing portion located intermediate said first hub assembly and said second hub assembly, said electric motor axle housing portion configured to receive an electric motor along a second axis transverse said first axis to drive said reduction gearbox opposite an input yoke which drives said reduction gearbox.

2. The axle assembly as recited in claim 1, further comprising an electric motor mounted along said second axis, said electric motor mounted to said electric motor axle housing portion on one side of said first axis.

3. The axle assembly as recited in claim 2, wherein said input yoke is disposed along said second axis opposite said electric motor.

4. The axle assembly as recited in claim 3, further comprising a motor shaft mounted for rotation about said second axis and driven by said electric motor, said motor shaft offset from said first axis.

5. The axle assembly as recited in claim 4, further comprising a planetary gear assembly comprising a sun gear driven by said motor shaft, said planetary gear assembly located within an input gearbox housing portion adjacent said electric motor axle housing portion and said input yoke.

6. The axle assembly as recited in claim 5, wherein said planetary gear assembly drives a pinion gear, said motor shaft extending through said pinion gear.

7. The axle assembly as recited in claim 6, wherein said input yoke drives said pinion gear through a planet carrier of said planetary gear assembly.

8. The axle assembly as recited in claim 6, further comprising a ring gear engaged with said pinion gear, said ring gear engaged with said reduction gearbox to drive said first and second hub assemblies.

9. The axle assembly as recited in claim 8, wherein said ring gear is coaxial with said first axis.

10. The axle assembly as recited in claim 1, wherein said electric motor axle housing portion includes a semi-spherical portion.

11. The axle assembly as recited in claim 1, further comprising said electric motor having a motor shaft mounted through a pinion gear of said reduction gearbox mounted for rotation with said input yoke.

12. The axle assembly as recited in claim 11, wherein said pinion gear is mounted to said input yoke for one-to-one rotation.

13. The axle assembly as recited in claim 1, further comprising said electric motor having a motor shaft mounted through a pinion gear of said reduction gearbox mounted to said input yoke, said motor shaft engaged with a gear reduction to drive said pinion gear therethrough.

14. The axle assembly as recited in claim 13, wherein said pinion gear is mounted to said input yoke through a set of planet carrier pins such that said input yoke drives said pinion gear without speed reduction.

15. An axle assembly comprising:
an axle housing;

a first hub assembly and a second hub assembly mounted to said axle housing for rotation about a first axis;

said axle housing having an electric motor axle housing portion intermediate said first hub assembly and said second hub assembly;

a gearbox mounted within said electric motor axle housing portion, said gearbox operable to drive said first hub assembly and said second hub assembly;

a motor shaft mounted within said electric motor axle housing portion and rotatable along a second axis transverse said first axis, said motor shaft engaged with said gearbox; and an input yoke disposed along said second axis, said input yoke engaged with said gearbox, said input yoke opposite said motor shaft.

16. The axle assembly as recited in claim 15, further comprising an electric motor providing a drive input along said second axis to drive said motor shaft.

17. An axle assembly comprising:

an axle housing;

a first hub assembly and a second hub assembly mounted to said axle housing for rotation about a first axis;

said axle housing having an electric motor axle housing portion intermediate said first hub assembly and said second hub assembly;

a gearbox mounted within said electric motor axle housing portion, said gearbox operable to drive said first hub assembly and said second hub assembly;

a motor shaft mounted within said electric motor axle housing portion and rotatable along a second axis transverse said first axis, said motor shaft engaged with said gearbox;

an input yoke disposed along said second axis, said input yoke engaged with said gearbox, an electric motor providing a drive input along said second axis to drive said motor shaft; and a selectively actuated coupling between said electric motor and said motor shaft.

18. The axle assembly as recited in claim 15, further comprising a planetary gear assembly engaged with said gearbox, said motor shaft, and said input yoke.

19. An axle assembly comprising:

an axle housing;

a first hub assembly and a second hub assembly mounted to said axle housing for rotation about a first axis;

said axle housing having an electric motor axle housing portion intermediate said first hub assembly and said second hub assembly;

a gearbox mounted within said electric motor axle housing portion, said gearbox comprises a ring gear engaged with a pinion gear operable to drive said first hub assembly and said second hub assembly;

a motor shaft mounted within said electric motor axle housing portion to extend through said pinion gear, said motor shaft rotatable along a second axis transverse said first axis; and an input yoke disposed along said second axis, said input yoke engaged with said gearbox.

20. The axle assembly as recited in claim 19, further comprising a planetary gear assembly engaged with said pinion gear, said motor shaft engageable with said planetary gear assembly at a first speed ratio and said input yoke engageable with said planetary gear assembly at a second speed ratio.

21. The axle assembly as recited in claim 20, including a planet carrier in driving engagement with said pinion gear wherein said input yoke is engaged with said planet carrier to directly drive said planet carrier.

22. The axle assembly as recited in claim 20, wherein said planetary gear assembly comprises a sun gear driven directly by said motor shaft.

23. The axle assembly as recited in claim 15, where said first axis is perpendicular to said second axis.

24. An axle assembly comprising:

an axle housing;

a first hub assembly and a second hub assembly mounted to said axle housing for rotation about a first axis;

said axle housing having an electric motor axle housing portion intermediate said first hub assembly and said second hub assembly;

an electric motor mounted to said electric motor axle housing portion, said electric motor providing a drive input along a second axis transverse to said first axis;

a gearbox mounted within said electric motor axle housing portion to drive said first hub assembly and said second hub assembly;

a planetary gear assembly engaged with said gearbox;

an input yoke being rotatable about said second axis and engaged with said planetary gear assembly, such that said input yoke directly drives a planet carrier of said planetary gear assembly; and a motor shaft rotatable about said second axis, said motor shaft engaged with said electric motor to drive said planetary gear assembly said electric motor mounted on an opposite side of said first axis relative to said input yoke.

* * * * *